US008724861B1

(12) United States Patent
Sun

(10) Patent No.: US 8,724,861 B1
(45) Date of Patent: May 13, 2014

(54) FINGERTIP FORCE, LOCATION, AND ORIENTATION SENSOR

(75) Inventor: Yu Sun, Tampa, FL (US)

(73) Assignee: University of South Florida, Tampa, FL (US)

( * ) Notice: Subject to any disclaimer, the term of this patent is extended or adjusted under 35 U.S.C. 154(b) by 69 days.

(21) Appl. No.: 13/310,957

(22) Filed: Dec. 5, 2011

Related U.S. Application Data

(60) Provisional application No. 61/420,007, filed on Dec. 6, 2010.

(51) Int. Cl.
*G06K 9/00* (2006.01)

(52) U.S. Cl.
USPC ........... 382/124; 382/115; 382/125; 345/158; 345/169; 345/173

(58) Field of Classification Search
USPC ................... 382/124, 125; 345/169, 173, 158
See application file for complete search history.

(56) References Cited

U.S. PATENT DOCUMENTS

| | | | |
|---|---|---|---|
| 4,156,230 A * | 5/1979 | Riganati et al. | 382/124 |
| 4,696,046 A * | 9/1987 | Schiller | 382/125 |
| 4,783,167 A * | 11/1988 | Schiller et al. | 356/71 |
| 5,613,014 A * | 3/1997 | Eshera et al. | 382/124 |
| 5,742,279 A * | 4/1998 | Yamamoto et al. | 345/173 |
| 5,799,098 A * | 8/1998 | Ort et al. | 382/125 |
| 5,892,838 A * | 4/1999 | Brady | 382/115 |
| 6,031,942 A * | 2/2000 | Nakayama | 382/284 |
| 6,064,753 A * | 5/2000 | Bolle et al. | 382/125 |
| 6,282,304 B1 * | 8/2001 | Novikov et al. | 382/125 |
| 6,400,836 B2 * | 6/2002 | Senior | 382/124 |
| 6,435,794 B1 | 8/2002 | Springer | |
| 6,707,934 B1 * | 3/2004 | Takeda et al. | 382/124 |
| 6,819,782 B1 * | 11/2004 | Imagawa et al. | 382/115 |
| 6,970,234 B2 * | 11/2005 | Nagasaka et al. | 356/71 |
| 7,627,150 B2 * | 12/2009 | Abiko et al. | 382/124 |
| 7,671,845 B2 | 3/2010 | Keely | |
| 7,885,437 B2 * | 2/2011 | Hara | 382/125 |
| 7,899,216 B2 * | 3/2011 | Watanabe et al. | 382/115 |
| 8,145,916 B2 * | 3/2012 | Boshra et al. | 713/186 |
| 2002/0031244 A1 * | 3/2002 | Rozenberg et al. | 382/124 |
| 2003/0149661 A1 * | 8/2003 | Mitchell et al. | 705/39 |
| 2003/0169910 A1 * | 9/2003 | Reisman et al. | 382/124 |
| 2006/0078176 A1 * | 4/2006 | Abiko et al. | 382/124 |
| 2006/0239514 A1 * | 10/2006 | Watanabe et al. | 382/115 |

(Continued)

OTHER PUBLICATIONS

Johansson, R.S.; Westling, G. Roles of glabrous skin receptors and sensorimotor memory in automatic control of precision grip when lifting rougher or more slippery objects. Experimental Brain Research. 1984, vol. 56, No. 3, pp. 550-564.

*Primary Examiner* — Vu Le
*Assistant Examiner* — Aklilu Woldemariam
(74) *Attorney, Agent, or Firm* — Andriy Lytvyn; Smith & Hopen, P.A.

(57) ABSTRACT

An integrated system for studying human grasping techniques includes a fingerprint sensor and a force sensor for simultaneously measuring the contact position and orientation of a fingertip together with the contact force and torque exerted by the fingertip during a grasp. The system uses the fingerprint image obtained from the fingerprint sensor to identify the contact position and orientation of the fingertip based on fingerprint features such as the core point and local ridge orientations. The contact position and orientation of the fingertip are represented in a fingertip coordinate system. The system has utility in human grasping studies to characterize the fingertip contact.

11 Claims, 9 Drawing Sheets

(56) References Cited

U.S. PATENT DOCUMENTS

| | | |
|---|---|---|
| 2006/0284858 A1 | 12/2006 | Rekimoto |
| 2008/0117409 A1* | 5/2008 | Nagasaka et al. ............... 356/71 |
| 2008/0298648 A1* | 12/2008 | Lo et al. ........................ 382/125 |
| 2009/0278798 A1* | 11/2009 | Kim et al. ..................... 345/158 |

* cited by examiner

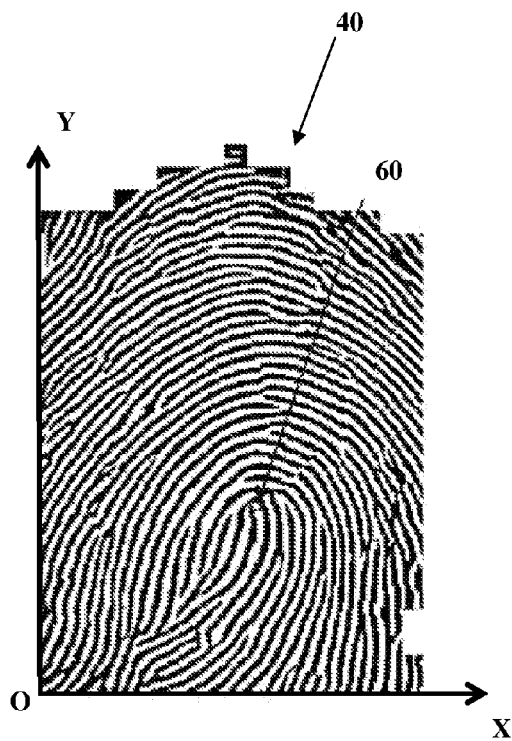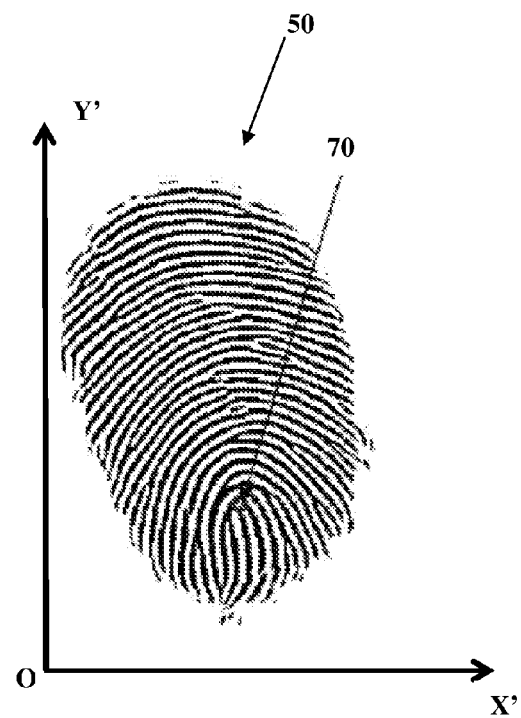
Fig. 12A                                    Fig. 12B

Fig. 13A                                    Fig. 13B

FINGERTIP FORCE, LOCATION, AND ORIENTATION SENSOR

CROSS REFERENCE TO RELATED APPLICATIONS

This application claims priority to U.S. Provisional Application No. 61/420,007 entitled "Fingertip Force, Location, and Orientation Sensor", filed Dec. 6, 2010 by the same inventor, the contents of which are hereby incorporated by reference into this disclosure.

BACKGROUND OF THE INVENTION

1. Field of the Invention

This invention relates, generally, to the arts of robotics and neuroscience. More particularly, it relates to a system for studying human grasping techniques by simultaneously identifying the contact position and orientation of the fingertip and measuring the force and torque exerted by the fingertip during various predetermined grasps.

2. Description of the Prior Art

Understanding of local mechanical interactions between human fingertips and an object is crucial to understanding human dexterity. With various kinds of force sensors, the fingertip force at the contact points on an object may be measured to study human dexterous grasping and manipulation. Many robot grasp planning and control algorithms have been developed with inspirations from human grasping studies. However, models that simply include contact force and contact location on the object have limited utility.

Studying human grasping techniques has significant implications for robotics because a human hand exhibits some of the most complex human motor skills. Many studies have proposed various taxonomies of human grasping. A basic distinction is between a power grasp, where the goal is to stabilize an object to resist external forces, and a precision grasp, which is an essential skill for manipulating an object, maintaining the grasp during various tasks, and re-grasping.

A preponderance of research has focused on precision grasps and on instrumentation to measure the fingertip forces and position on the object during contact. A rich experimental paradigm for the study of human grasping was disclosed by Johansson and Westling in *Roles of Glabrous Skin Receptors and Sensorimotor Memory in Automatic Control of Precision Grip when Lifting Rougher or More Slippery Objects*. This approach to studying human grasping involves parallel force-sensing pads for opposition grasps between the index finger and the thumb. This approach has been generalized to add more touch pads to include the middle, ring, and little fingers in addition to the index finger-thumb pair. In general, instrumented objects are typically created that incorporate miniature 6-axis force/torque sensors at predefined grasp points.

Besides the complex hand postures and forces during grasping, the great variance in what parts of the fingertip contact an object makes the grasping studies very complex. Many studies have been carried out to characterize the mechanical profile in the fingertip responding to a force. For example, Serina et al. and Pawluk and Howe have examined the dynamic force response of the fingertip to indenters of different sizes and shapes.

Many research teams have experimented with using various kinds of force sensors to measure the fingertip force at the contact points on an object. Many encouraging results have been achieved. However, more and more researchers have realized the limitation of the models that only include contact force and contact position on the object. Many researchers have sought for a way to measure the contact position on the fingertip to better model and understand more sophisticated grasping techniques such as rolling and re-grasping.

Commercial tactile sensors and flexible tactile sensors have been successfully embedded on many robotic fingers to provide rich spatial grasping information for grasping control. However, due to their stiffness, those tactile sensors cannot deform along with the human finger tissue to preserve the elastic profile, which prevents them from being used in many human grasping studies. Most studies attach tactile sensors on the force sensors rather than on the fingertip, thus obtaining local contact spatial profiles around the contact point, but not being capable of identifying the contact position on the fingertip.

Thus there is a need in neuroscience and robotics for a sensor capable of measuring the fingertip force and torque, the contact location, and the orientation of the fingertip.

However, in view of the art considered as a whole at the time the present invention was made, it was not obvious to those of ordinary skill in the art how the needed structure could be provided.

SUMMARY OF THE INVENTION

The long-standing but heretofore unfulfilled need for studying human grasping techniques through a system capable of measuring the force and torque exerted by a human fingertip during a grasp and simultaneously determining that fingertip's contact position and orientation is now met by a new, useful, and non-obvious invention.

The inventive system utilizes a six-axis force/torque sensor to measure the force and torque exerted by a fingertip during various grasps. The invention also utilizes a fingertip sensor rigidly mounted onto the force/torque sensor to simultaneously determine the contact position and orientation of the fingertip. The system is placed on a physical object, grasping of which is being studied, at a point where a fingertip makes contact with that object during a grasp. To obtain the most comprehensive data about the grasp, five such inventive systems can be placed at all five contact points corresponding to the five fingertips of a human hand. The positioning of the sensor system can be adjusted to correspond to the fingertip contact points for the particular grasp being studied. The invention can be used to study a wide variety of grasping techniques for a plethora of different objects.

For each human subject whose grasping techniques are being studied, a fingerprint map of each fingertip must be constructed. The invention contemplates construction of a two-dimensional fingerprint map from a sequence of overlapping fingerprint images. Such sequence is obtained by rolling a subject's fingertip on a fingerprint scanner. If the fingerprint scanner has a sufficiently large window, the images are assumed to be pre-aligned and no registration or realignment is required. However, if the fingerprint sensor does not have a scanning window of a sufficient size, the fingerprint map is constructed through utilization of one of many techniques known in the art for aligning the fingerprint images and then combining the multiple partially overlapping images into a single fingerprint image. Due to unique nature of every fingerprint, the fingerprint map construction procedure outlined above must be performed for each fingertip of every human subject participating in the study.

In addition to measuring force and torque, the invention allows researchers to determine the contact position and orientation of the fingertip during a grasp. The contact position of the fingertip relative to the force sensor is obtained by extracting the fingerprint area from the background of the fingertip image and computing the centroid of the fingerprint area.

The contact position and orientation relative to the fingertip are obtained by registering the fingerprint image onto a pre-constructed fingerprint map. A number of suitable registration approaches are known in the art. However, for the purpose of reducing computation time, the invention contemplates using a registration approach based on the following parameters: coordinates of the core points on the fingerprint image and the fingerprint map and the rotation angle, which is defined as the angular difference between the local ridge orientation at the core point on the fingerprint image and the local ridge orientation at the core point on the fingerprint map. Once these parameters are obtained, the center point of the fingerprint image is registered onto the fingerprint map, and the contact position and orientation relative to the fingertip are fully characterized.

In grasping and hand manipulation studies, the novel device is not limited to measuring only the contact force, which is a limitation present in most prior art devices, but is also capable of determining the contact spatial features relative to the fingertip and the force sensor without sacrificing the precision. This constitutes a major advantage over prior art and enables roboticists and neuroscientists to characterize human hands locomotion in substantially enhanced detail.

In summary, the inventive system is capable of measuring all three components of force and all three components of torque exerted by a human fingertip during a grasp and simultaneously determining the fingertip's contact position relative to the force sensor, the contact position relative to the fingertip, and the orientation of the fingertip relative to the force sensor. The invention enables researchers to collect detailed and comprehensive data about human grasps, thus enabling those skilled in the art of robotics to study human grasping techniques and develop algorithms closely mimicking those techniques for implementation in robotics.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 12A depicts the core point on a fingerprint map and the coordinate system used to define the location of said core point;

FIG. 12B depicts the core point on a fingerprint image and the coordinate system used to define the location of said core point;

FIG. 13A depicts the local ridge around the core point of the fingerprint map;

FIG. 13B depicts the local ridge around the core point of the fingerprint image;

DETAILED DESCRIPTION OF THE PREFERRED EMBODIMENT

Figure 1:
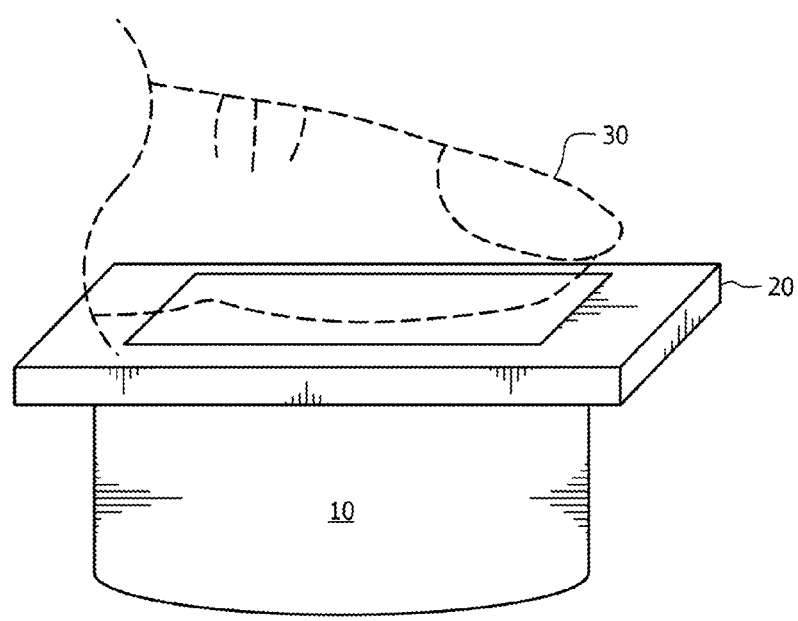
FIG. 1 is a schematic drawing of the novel integrated sensor system that includes a force sensor and a fingerprint sensor.

FIG. 1 depicts an illustrative embodiment of the novel structure. More particularly, said FIG. 1 is a schematic drawing of the novel sensor system including a fingerprint sensor 20 and a force sensor 10.

Figure 2:
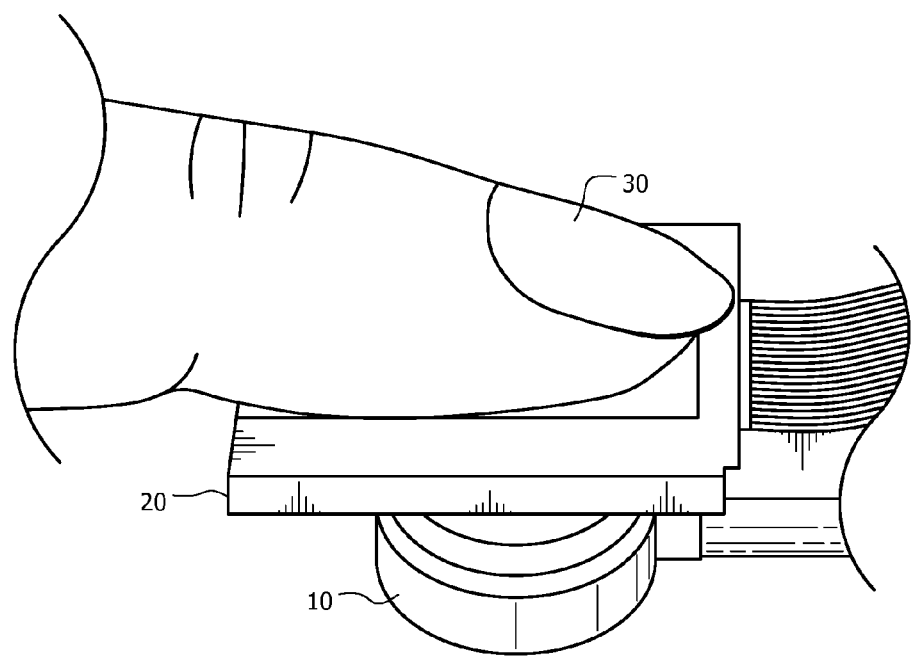
FIG. 2 depicts a first embodiment of the novel integrated sensor system, in which a solid-state fingerprint sensor is utilized.
Figure 3:
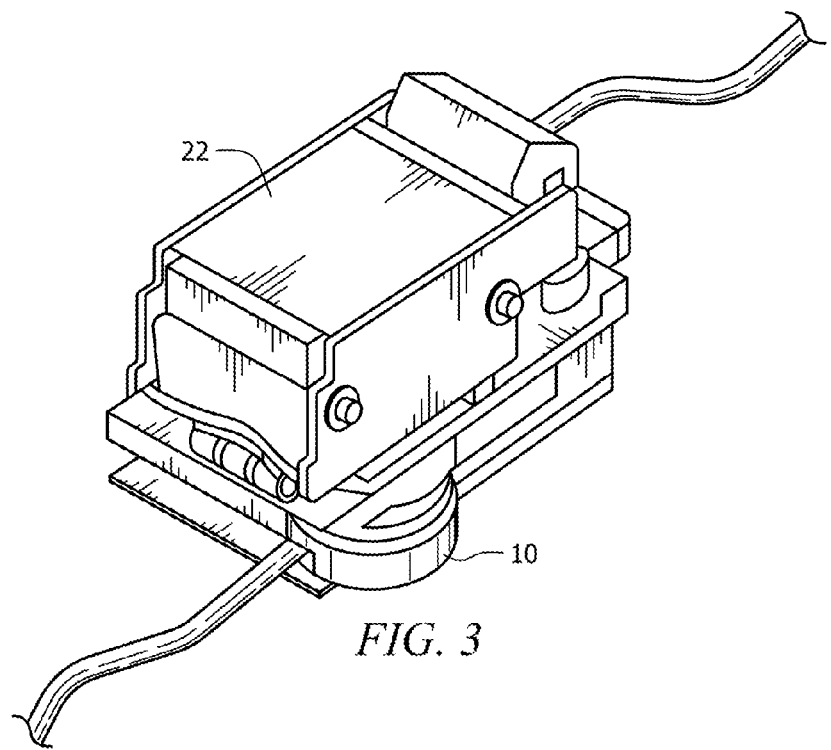
FIG. 3 depicts a second embodiment of the novel integrated sensor system, in which an optical fingerprint sensor is utilized.
Figure 4:
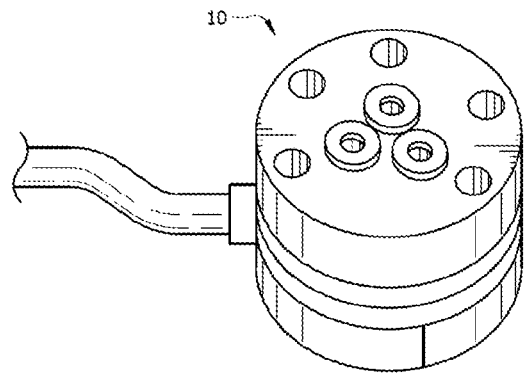
FIG. 4 depicts a 6-axis force/torque sensor.
Figure 5A:
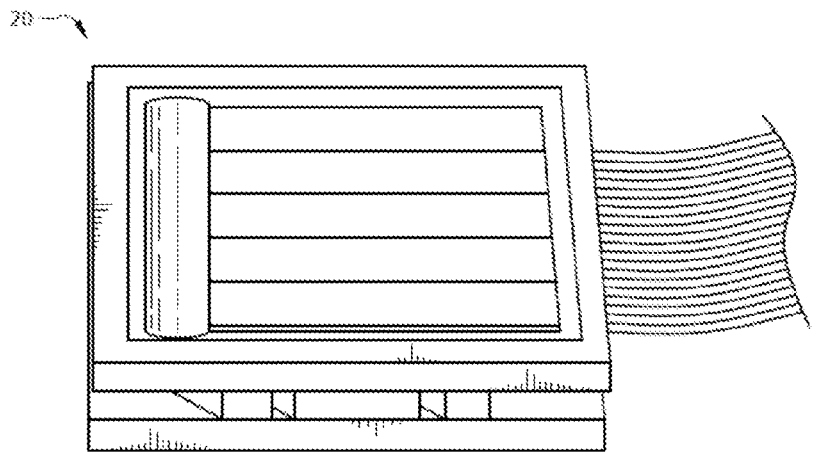
FIG. 5A depicts a solid-state fingerprint sensor.
Figure 5B:
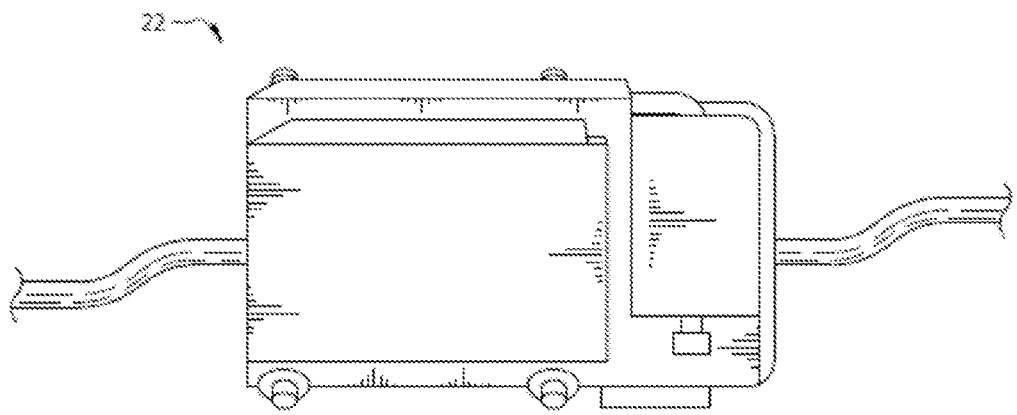
FIG. 5B depicts an optical fingerprint sensor.
Figures 6A, 6B, 6C, 6D, 6E, 6F:
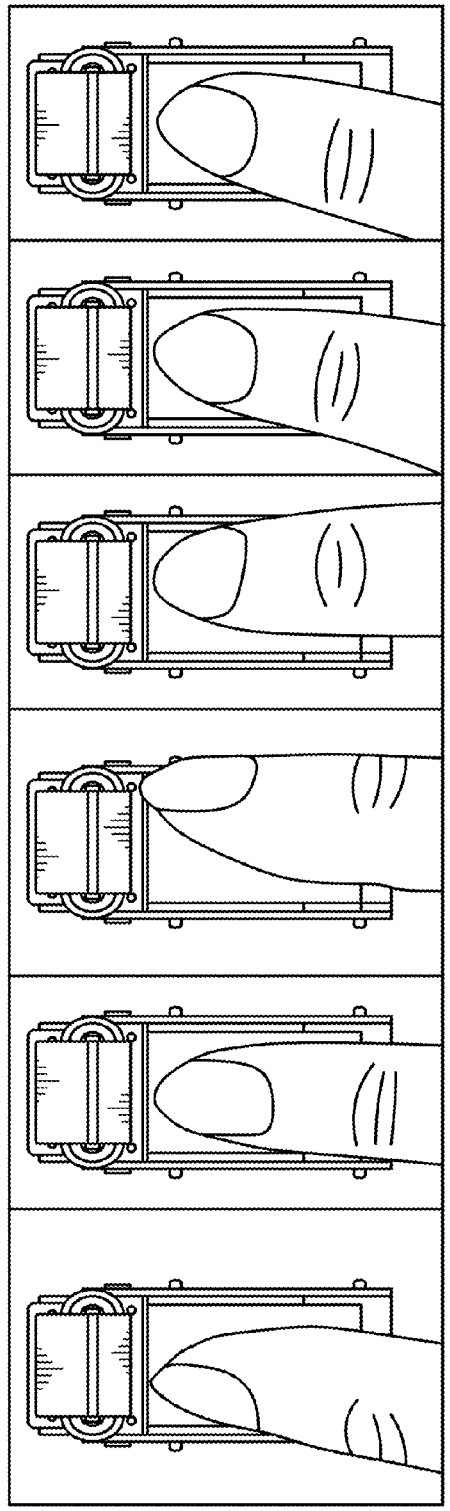
FIG. 6A is the first figure of a six-figure animation depicting a fingertip being rolled on a fingerprint sensor.
FIG. 6B is the second figure of said six-figure animation.
FIG. 6C is the third figure of said six-figure animation.
FIG. 6D is the fourth figure of said six-figure animation.
FIG. 6E is the fifth figure of said six-figure animation.
FIG. 6F is the sixth figure of said six-figure animation.
Figures 7A, 7B, 7C, 7D, 7E, 7F:
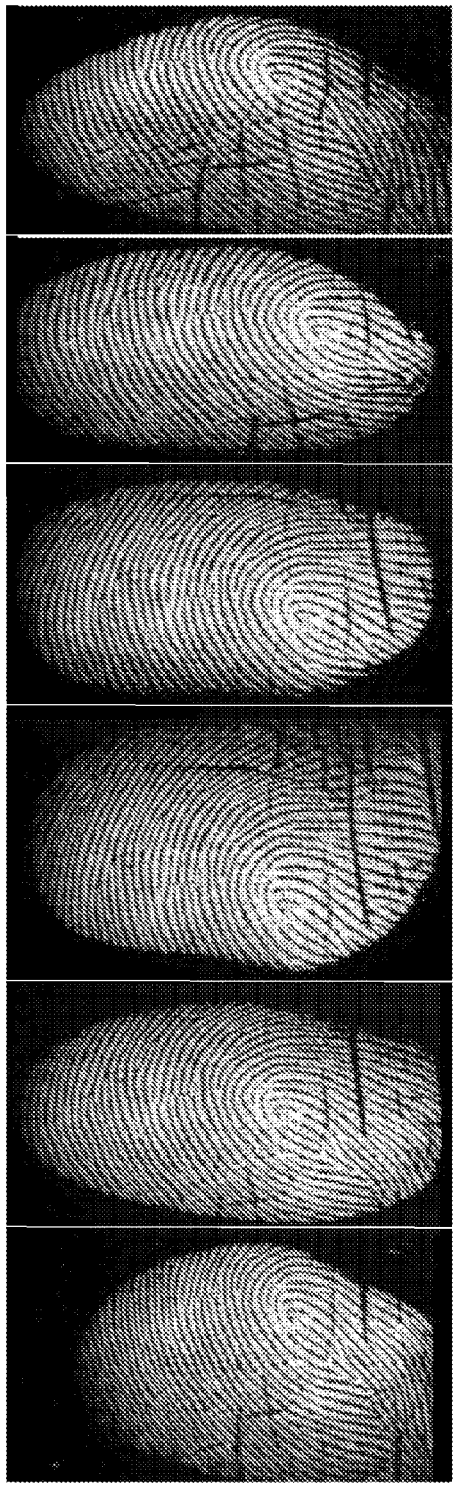
FIG. 7A depicts the fingerprint image taken to construct a fingerprint map from the fingertip position of FIG. 6A.
FIG. 7B depicts the fingerprint image taken to construct a fingerprint map from the fingertip position of FIG. 6B.
FIG. 7C depicts the fingerprint image taken to construct a fingerprint map from the fingertip position of FIG. 6C.
FIG. 7D depicts the fingerprint image taken to construct a fingerprint map from the fingertip position of FIG. 6D.
FIG. 7E depicts the fingerprint image taken to construct a fingerprint map from the fingertip position of FIG. 6E.
FIG. 7F depicts the fingerprint image taken to construct a fingerprint map from the fingertip position of FIG. 6F.

FIGS. 2 and 3 depict two embodiments of the inventive sensor system utilizing two different types of fingerprint sensors: FIG. 2 depicts the preferred embodiment of the inventive system with solid-state fingerprint sensor 20 (FIG. 5A), and FIG. 3 depicts the inventive system with an optical fingerprint sensor 22 (FIG. 5B). In both embodiments, the fingerprint sensor is mounted on the tool face of a 6-axis force/torque sensor, which is depicted in FIG. 4. Both force sensor 10 and fingerprint sensor 20 are connected to a computer, which is used for collection and processing of data. The force readings are collected using a data acquisition board.

Weight and thickness of a typical fingerprint sensor are relatively small compared to those of a force sensor, and therefore, do not substantially affect the accuracy of the force and torque readings. Due to their thinness and low weight, solid-state fingerprint sensors, such as the one depicted in FIG. 5A are preferred over the optical fingerprint sensors, such as the one depicted in FIG. 5B. However, notwithstanding its larger thickness and weight, optical fingerprint sensor 22 is suitable for use in the inventive system to study many human grasps.

Compared to a sampling rate of a typical force sensor, most conventional fingerprint sensors have very low sampling rates. However, since the contact position of a fingertip does not change rapidly during a grasp, the relative low sampling rate of a fingerprint sensor does not constitute a substantial limitation for typical grasping studies. Nevertheless, fingerprint sensors capable of higher sampling rates are preferred as they will provide more comprehensive and accurate data, especially when studying complex grasps.

Figure 8A:
FIG. 8A is a fingerprint map constructed from a sequence of fingerprint images depicted in FIGS. 7A-F.
Figure 8B:
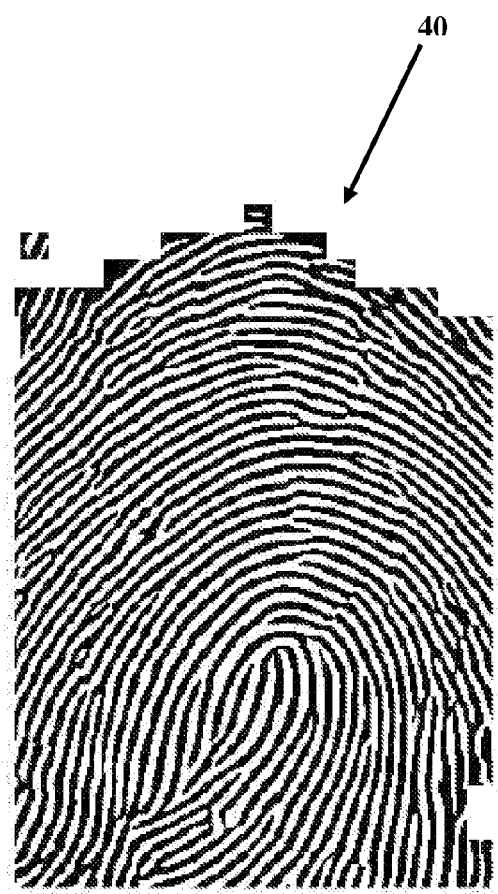
FIG. 8B is an enhanced fingerprint map of FIG. 8A.

Inventive system uses a computer to collect the data from both force sensor 10 and fingerprint sensor 20. A data acquisition card reads the force data from force sensor 10 and fingerprint sensor 20 at a specified sampling rate. Fingerprint images are processed with an image enhancement algorithm to reduce noise and increase robustness by improving the clarity of ridges and valleys; enhancement of a fingerprint image is depicted in FIGS. 8A-B.

To accurately represent the location of the contact area on fingertip 30, a fingerprint map 40 (FIGS. 8A-B) depicting entire fingertip 30 is constructed. Fingerprint map 40 is a two-dimensional representation of the curved surface of entire fingertip 30.

A preferred method for constructing fingerprint map 40 requires a fingerprint sensor with a sufficiently large scanning window. Fingerprint map 40 is constructed from a sequence of fingerprints obtained by rolling fingertip 30 on a fingerprint sensor. As fingertip 30 is being rolled, the sensor acquires a sequence of fingerprint images. These images are then combined into a single fingerprint map. FIGS. 6A-F depict a fingertip being rolled on a fingerprint sensor, and FIGS. 7A-F depict the set of fingerprint images taken to construct a fingerprint map. Assuming that no slippage occurs when fingertip 30 is being rolled on the sensor, fingerprint images are considered to be properly aligned and, therefore, are combined without any registration or realignment. FIG. 8A depicts the composed fingerprint map from the fingerprint sequence in FIGS. 7A-F.

An alternative method for constructing a fingerprint map utilizes a fingerprint sensor with a small scanning window. According to this method, portions of the fingerprint are captured one at a time. The acquired images are then aligned to properly fit with each other. A number of well-known techniques exist for combining multiple partially overlapping fingerprint images into a single fingerprint image. One such technique involves the fingerprint foregrounds being segmented from the background and then stacked together. The pixel values at overlapping areas are computed by averaging the pixel values of the overlapping foregrounds.

Figure 9:
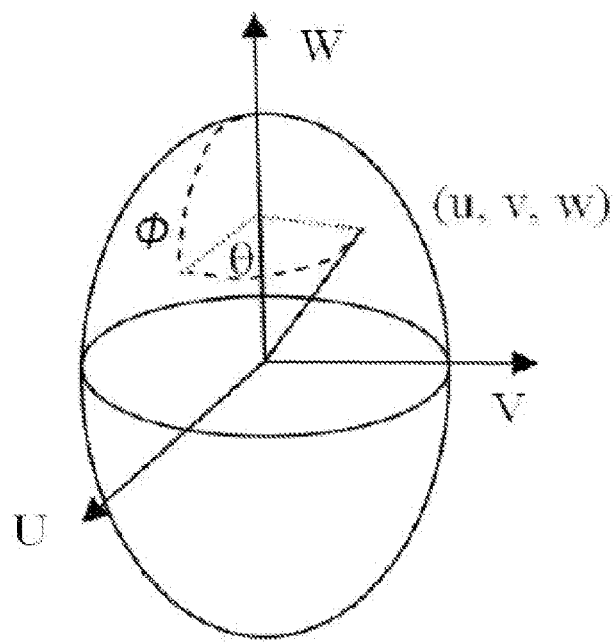
FIG. 9 depicts a spherical coordinate system that is used to represent the contact position on the fingertip.

FIG. 9 depicts a spherical coordinate system that is used to represent the contact position on fingertip 30. The shape of fingertip 30 is approximated as a quarter of an ellipsoid. Therefore, a point on fingertip 30 can be represented using the following equations:

$$u = a \sin\phi \cos\theta \quad (1)$$

$$v = b \sin\phi \sin\theta \quad (2)$$

$$w = c \cos\phi \quad (3)$$

Variables a, b, and c are fixed, and the pair ($\theta$, $\phi$) can sufficiently represent any point on fingertip 30 with $-\pi/2 < \theta < \pi/2$ and $0 < \phi < \pi/2$, where $\phi$ is the colatitude, or zenith, and $\theta$ is the longitude, or azimuth. This coordinate system is depicted in FIG. 9. To further reduce the complexity, fingertip 30 is assumed to be a spheroid so that a=b=r, then any point on fingertip 30 can be expressed using the following equations:

$$u = r \sin\phi \cos\theta \quad (4)$$

$$v = r \sin\phi \sin\theta \quad (5)$$

$$w = c \cos\phi. \quad (6)$$

Figure 10:
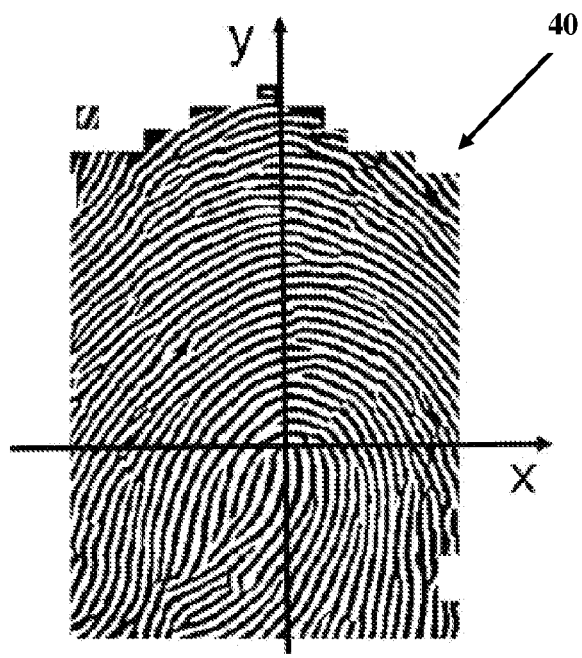
FIG. 10 depicts the defined coordinate system on the fingerprint map.

To identify the contact position on fingerprint map 40, the following coordinate system is defined on fingerprint map 40: the origin (0,0) is located at the core point, the x-axis is along the horizontal axis of the fingerprint, and the y-axis is along its vertical axis. This coordinate system makes it possible to represent any point on fingertip 30 with a set of numerical coordinates corresponding to a location on fingerprint map 40. This coordinate system is depicted in FIG. 10.

Fingerprint sensor 20 is aligned with the W-axis in fingertip coordinate system depicted in FIG. 9. Rolling behavior of fingertip 30 in the roll direction relates the angle $\theta$ to the latitude on fingerprint map 40 with the following equation:

$$x = 2\pi r \phi \quad (7)$$

The rolling behavior on the pitch direction relates the colatitude angle $\phi_1$ to the y-axis in fingerprint map 40 with the elliptic integral of the second kind, as expressed in the following equation, where y is the length of the elliptical arc with $\phi$ degree:

$$y = c \int_0^{\phi_1} \sqrt{1 - \frac{c^2 - r^2}{c^2} \sin^2\varphi} \, d\varphi \quad (8)$$

If a contact position (x, y) is located on fingerprint map 40, its ($\theta$, $\phi$) in fingertip coordinate system can be computed with Equations 7 and 8. The parameters c and r are calibrated with the following initial values: $\theta=0$, $\theta=\pi/2$, $\phi=0$, and $\phi=\pi/2$, and $\phi$ may be retrieved from a $\phi$-y table pre-computed with numerical integration.

Turning now to contact characterization, it is understood that there are number of variables when fingertip 30 contacts force sensor 10. Most prior art research studies have analyzed only force and torque, failing to consider the contact position and orientation of fingertip 30 relative to force sensor 10 or relative to fingertip 30. Through utilization of fingerprint sensor 20, the novel sensor system can measure three additional contact characteristics: the contact position relative to force sensor 10, the contact position on fingertip 30, and the relative orientation between force sensor 10 and fingertip 30.

Considering the contact position relative to force sensor 10, since fingerprint sensor 20 is rigidly attached and aligned to force sensor 10, the contact area on fingerprint sensor 20 can be used to compute the location at which the contact force is applied. Unlike prior art studies, this approach does not require assumptions that the force is always applied at the center of force sensor 10 or that the contact area covers the entire surface of force sensor 10. For many human grasping studies, it is crucial to know the exact position at which fingertip 30 comes into contact with force sensor 10.

Figures 11A, 11B:
FIG. 11A is a fingerprint image.
FIG. 11B depicts the area of the fingerprint in the fingerprint image of FIG. 11A.

FIG. 11A depicts a fingerprint image 50 obtained by fingerprint sensor 20. The fingerprint area is extracted from the background through image closing and erosion as shown in FIG. 11B. The centroid of the fingerprint area is computed, and the centroid is defined as the contact position of fingertip 30 relative to force sensor 10.

To determine the contact position on fingertip 30 and orientation of fingertip 30 relative to force sensor 10, fingerprint image 50 is registered onto fingerprint map 40. A number of registration approaches are known in the prior art. The contact position and orientation on the fingerprint can be obtained from the registration result. Although many registration approaches exist, most of them involve feature extraction and correlation matching and, therefore, require a long computation time.

The novel sensor system uses the fingerprint features, specifically, core points 60 and 70 (FIGS. 12A-B) and local ridge orientations at core points 60 and 70, (FIGS. 13A-B) to develop a simple approach for estimating the fingerprint position and orientation. However, if core points 60 and 70 cannot be located, regular image registration approaches can be used to obtain the fingerprint location and orientation.

FIG. 12A depicts core point 60 on fingerprint map 40, and FIG. 12B depicts core point 70 on fingerprint image 50. Core points 60 and 70 are defined as the points of maximum ridge curvature. After fingerprint enhancement, an automatic core point extraction approach utilizing a complex filter is implemented and applied to fingerprint image 50 to obtain the position of core point 70 and its spatial orientation. As depicted in FIGS. 12A-B, the origin on fingerprint image 50 is defined at the left-bottom corner of fingerprint image 50, and the origin on fingerprint map 40 is defined at the left-bottom corner of fingerprint map 40. The x- and y-coordinates of core points 60 and 70 are identified using these coordinate systems.

The local ridge orientation at a pixel is defined as the rotation angle $\alpha$ at a point crossing through a small neighborhood centered at that pixel. Since fingerprint ridges are not directed, the rotation angle $\alpha$ is defined in the range of $0 \leq \alpha \leq \pi$. Extraction of local ridge orientations requires computation of gradients in fingerprint image 50. The orientation around core points 60 and 70 in both fingerprint map 40 and fingerprint image 50 can be obtained. Their angle difference is computed and defined as the rotation angle $\alpha$.

With translation and rotation between the new fingerprint and fingerprint map being known, a point $p'=(x', y')$ on fingerprint image 50 can be transformed to a point $p=(x, y)$ in fingerprint map 40 by using the following equations:

$$(p-p')=R(\alpha)(p-p')+(p-p'_{core}) \quad (9)$$

$$R(\alpha) = \begin{bmatrix} \cos(\alpha) & \sin(\alpha) \\ -\sin(\alpha) & \cos(\alpha) \end{bmatrix} \quad (10)$$

$p_{core}$ and $p'_{core}$ are core points 60 and 70 respectively; and $\alpha$ is the relative rotation angle between fingerprint map 40 and fingerprint image 50. The center point of fingerprint image 50 is registered to fingerprint map 40 with Equation 9. The contact properties are fully characterized with Equations 7 and 8.

A contact force between fingertip 30 and an object can be characterized in both the human subject's coordinate system and the world coordinate system. The contact force ($F_x$, $F_y$, $F_z$) and torque ($T_x$, $T_y$, $T_z$) are not assumed to be always applied at the center of force sensor 10. Instead, fingerprint sensor 20 measures the real contact position ($P_x$, $P_y$, $P_z$) relative to the center of force sensor 10, and it is a variable during a grasp. Contact position ($\phi, \theta$) and orientation $\alpha$ relative to fingertip 30 can also be determined. The force ($F_x$, $F_y$, $F_z$) and torque ($T_x$, $T_y$, $T_z$) can be expressed in fingertip coordinate system.

Figure 14A:
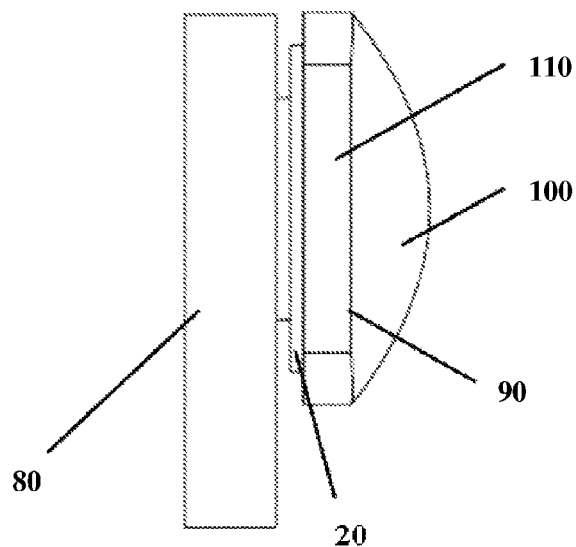
FIG. 14A depicts an artificial robotic finger.
Figure 14B:
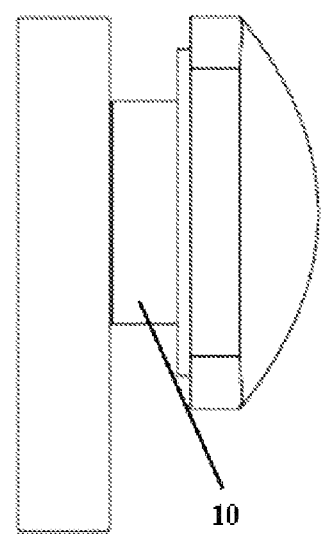
FIG. 14B depicts a force/torque sensor that can be mounted under the fingerprint sensor to provide additional force and torque reading.

Fingerprint sensor 20 can also be used to design an artificial robotic finger that is illustrated in FIG. 14A. A piece of rubber/silicon 100 with certain elastic property covers above fingerprint sensor 20 that is mounted on a plate 80. The elastic property of rubber/silicon 100 is selected with experiments or computation to suit the applications that artificial finger is used for. Rubber/silicon 100 can be loosely attached to fingerprint sensor 20 or there could be a hollow space 110 between fingerprint sensor 20 surface and rubber/silicon 100. Air or liquid could fill hollow space 110 depending on the application. An artificial finger surface 90, which has a texture similar to that of human fingerprints, is laid over the surface of rubber/silicon 100 that is facing fingerprint sensor 20. The physical property of the texture on rubber/silicon 100 is designed to match the type of fingerprint sensor 20. For example, if fingerprint sensor 20 is a capacitance sensor, the texture laid on the rubber should have capacitance. If fingerprint sensor 20 is an optical sensor, the texture laid on rubber/silicon 100 should be visible to fingerprint sensor 20.

The same image registration approach as above is used to estimate the contact location and orientation on rubber/silicon 100. Since rubber/silicon 100 is fixed above fingerprint sensor 20, the contact location on fingerprint sensor 20 is also obtained. Due to the elasticity of rubber/silicon 100, the same contact location on fingerprint sensor 20 does not necessarily give the same contact location on the rubber/silicon 100. The difference between those two measurements represents the shear movement of rubber/silicon 100, which represents the shear force applied on the artificial finger through rubber/silicon 100. The orientation measurement represents the normal torque on artificial finger surface 90 through rubber/silicon 100. The area of the contact can represent the normal force level.

The relation between the area of the contact obtained through fingerprint sensor 20 and the normal force level on artificial finger surface 90, the relation between the fingerprint orientation measurement through fingerprint sensor 20 and the normal torque on artificial finger surface 90, and the relation between the difference of the two contact location measurements and the shear force on artificial fingertip surface 90 can all be calibrated with experiment and computation from the design.

A force and torque sensor can be mounted under fingerprint sensor 20 (FIG. 11B) to provide additional force and torque readings if necessary.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for studying human grasping, comprising:
   a six-axis force and torque sensor placed in a predefined contact point on an object, the six-axis force and torque sensor configured to simultaneously measure three components of force and three components of torque exerted by a human fingertip while grasping the object; and
   a fingerprint sensor attached to the six-axis force and torque sensor, the fingerprint sensor configured to produce a fingerprint image of the human fingertip; and
   a data acquisition device configured to read data from the six-axis force and torque sensor and the fingerprint sensor at a predetermined sampling rate, the data being used to determine a contact position of the fingertip relative to the six-axis force and torque sensor, a contact position on the fingertip, and a relative orientation between the six-axis force and torque sensor and the fingertip;
   wherein the contact position on the fingertip and the relative orientation between the fingertip and the force sensor are determined from a result of registration of the center point of the fingerprint image onto a pre-constructed fingerprint map.

2. The apparatus of claim 1, wherein the fingerprint sensor is a solid-state fingerprint sensor.

3. The apparatus of claim 1, wherein the fingerprint sensor is an optical fingerprint sensor.

4. The apparatus of claim 1, wherein the contact position of the fingertip relative to the force sensor is obtained through extraction of a fingerprint area from the fingerprint image and computing the centroid of the fingerprint area.

5. The apparatus of claim 1, wherein obtaining the result of registration of the center point of the fingerprint image onto a pre-constructed fingerprint map comprises the steps of:
- extracting coordinates of the core point on the fingerprint image and on the fingerprint map,
- determining the rotation angle of the fingerprint image relative to the fingerprint map based on the angular difference between the local ridge orientation at the core point on the fingerprint image and the local ridge orientation at the core point on the fingerprint map, and
- using the coordinates of the core point and the rotation angle to register the center point of the fingerprint image onto the fingerprint map.

6. A method for studying human grasping, comprising the steps of:
- placing, in a predetermined position on an object, a six-axis force and torque sensor having an attached fingerprint sensor;
- measuring simultaneously three components of a torque and three components of a force exerted by a fingertip;
- obtaining a fingerprint image of the fingertip from the fingerprint sensor;
- determining a contact position of the fingertip relative to the six-axis force and torque sensor, a contact position on the fingertip, and a relative orientation between the six-axis force and torque sensor and the fingertip;
- wherein determining the contact position on the fingertip and the relative orientation between the six-axis force and torque sensor comprises the steps of:
- extracting coordinates of a core point on the fingerprint image and on a fingerprint map;
- determining the local ridge orientation at the core point on the fingerprint image and the local ridge orientation at the core point on the fingerprint map;
- computing a rotation angle of the fingerprint image relative to the fingerprint map by determining angular difference between the local ridge orientations at the core point;
- registering the center point of the fingerprint image onto the fingerprint map using the coordinates of the core point and the rotation angle; and
- characterizing the contact position on the fingertip and the relative orientation between the fingertip and the six-axis force and torque sensor based on the result of the registration.

7. The method of claim 6, further comprising the step of:
constructing the fingerprint map by obtaining a sequence of fingerprint images by rolling the fingertip on a fingerprint sensor and combining the sequence of fingerprint images into a single fingerprint map.

8. The method of claim 6, further comprising the step of:
using a spherical coordinate system to represent the contact position and orientation of the fingertip.

9. The method of claim 6, further comprising the steps of:
defining a fingerprint coordinate system as having an origin at a core point on the fingerprint map, an x-axis along the width of the fingerprint, and a y-axis along the length of the fingerprint; and
expressing the contact position and orientation of the fingertip using the fingerprint coordinate system.

10. The method of claim 6, further comprising the steps of:
extracting a fingerprint area from the obtained fingerprint image; and
computing the centroid of the fingerprint area to determine the contact position of the fingertip relative to the force sensor.

11. The method of claim 6, further comprising the steps of:
registering the obtained fingerprint image onto the fingerprint map; and
determining the contact position relative to the fingertip and the orientation of the fingertip relative to the force sensor from the registration result.

* * * * *